United States Patent [19]

Seymour

[11] Patent Number: 5,393,187
[45] Date of Patent: Feb. 28, 1995

[54] CONTINUOUS BULK UNLOADER/RECLAIMER

[76] Inventor: Timothy H. Seymour, 9544 Moran St., Biloxi, Miss. 39532

[21] Appl. No.: 931,762

[22] Filed: Aug. 18, 1992

[51] Int. Cl.⁶ .............................................. B65G 67/60
[52] U.S. Cl. ............................... 414/141.1; 414/140.9; 198/509; 198/512
[58] Field of Search ............... 414/140.9, 141.1, 141.3, 414/141.4, 141.6, 142.2, 142.5; 198/509, 511, 512

[56] References Cited

U.S. PATENT DOCUMENTS

| | | | |
|---|---|---|---|
| 1,216,603 | 2/1917 | Phillips | 414/141.6 |
| 1,448,272 | 3/1923 | Kelly | 414/141.4 |
| 2,311,084 | 2/1943 | Redler | 414/140.9 |
| 3,378,130 | 4/1968 | Wallace | 198/509 |
| 3,688,893 | 9/1972 | Wallace, Jr. | 198/509 |
| 3,910,404 | 10/1975 | Henrekson | 198/712 |
| 4,336,877 | 6/1982 | Gill | 414/141.1 |
| 4,832,182 | 5/1989 | Wallace, Jr. | 198/509 |
| 4,858,775 | 8/1989 | Crouch | 414/141.3 |
| 4,860,884 | 8/1989 | Kostrewa | 414/141.1 |
| 4,917,234 | 4/1990 | Seymour | 198/509 |

FOREIGN PATENT DOCUMENTS

| | | | |
|---|---|---|---|
| 496881 | 4/1930 | Germany | 414/140.9 |
| 2657394 | 6/1977 | Germany | 414/141.6 |
| 0165633 | 12/1981 | Japan | 414/141.1 |
| 0069635 | 4/1983 | Japan | 414/141.1 |
| 0092126 | 4/1989 | Japan | 414/140.9 |
| 2081203 | 2/1982 | United Kingdom | 414/141.1 |

*Primary Examiner*—David A. Bucci
*Assistant Examiner*—Gregory A. Morse

[57] ABSTRACT

A continuous bulk unloader/reclaimer that utilizes a bucket conveyor digging chain 18 to remove material 16 from the holds 14 of vessels such as ships, barges, railroad cars, pits, stockpiles etc. The conveyor chain 18 is comprised of an elastomer bushing 32 that allows for the bucket conveyor chain 18 to circulate at high speeds with increased durability. Many improvements are described to make the unloader/reclaimer practical.

10 Claims, 7 Drawing Sheets

CONTINUOUS BULK UNLOADER/RECLAIMER

RELATED APPLICATIONS

This application is related to my copending International Application Ser. No. PCT/US/02108 filed Mar. 12, 1992, "Improved Digging Chain Continuous Bulk Unloader/Reclaimer" now pending.

1. Field of the Invention

This invention relates to continuous bulk unloaders/reclaimers (herein afterward referred to as continuous unloaders) that use a digging chain to both reclaim and convey granular or powder bulk materials such as grains, coal, ores, fertilizers, rocks, soil, etc. from pits, stockpiles, and the cargo holds of vessels such as ships, barges, railcars, and the like.

2. Description of Prior Art

U.S. Pat. No. 3,144,142 (1964) introduced an unloader for ships that utilized a digging chain that reclaimed cargo as it drug through the cargo in a loop. This patent utilized a mechanical chain similar to bicycle type chains comprised of metal links, pins, bushings, rollers, sprockets, etc. with buckets attached. U.S. Pat. No. 3,378,130 (1968) improved upon this unloader by using wire rope segments to replace the bicycle type chain. This was done because the wear of the chain's pins and bushings made the original invention impractical for most materials. It was also done in an effort to increase the speed of circulation of the chain of buckets because bicycle type chains of the size required for unloaders have a speed limit of about 200 feet per minute. These speeds cause the size and weight of these unloaders to be impractical for most applications. Low chain speeds are required because of the detrimental dynamic effects resulting from a phenomenon known as chordal action.

To date this second invention has had little commercial success because the wire ropes experience high wear and the speed of circulation is not much higher than that of ordinary bicycle type chains.

Today there are a few unloaders in operation that utilize the method of dragging the buckets through the material because it has many advantages, however in general these unloaders have reverted back to utilizing bicycle type chains with buckets attached similar to the method taught in the first invention U.S. Pat. No. 3,144,142. In general, these unloaders are restricted to working in non-abrasive materials because of the chain's pin and bushing wear. Also, they are large and heavy due to the slow circulation speeds of the chain.

I introduced in my International Patent Application No. PCT/US/02108 a far superior unloader that utilizes an elastomer bushed chain that allows for high speed circulation of the chain which allows for a smaller unloader to do the same amount of work as a much larger unloader utilizing a bicycle type chain.

In my U.S. Pat. No. 5,127,883 I introduced a chain and sprocket arrangement that utilizes an elastomer bushed chain and special sprocket that allows for conveyors to operate at increased speeds.

The present invention will introduce additional means and methods for improving upon my two previous inventions.

OBJECTS AND ADVANTAGES

Accordingly, the following are the objects and advantages of my invention:

To introduce a much improved digging chain type continuous bulk unloader/reclaimer that uses the digging chain principal, an elastomer bushed/spring hinged chain, and:

- Guides for controlling the motion of the digging chain in the digging loop.
- An adjustable boom for changing the geometry of the digging loop, and which makes it easy to store and insert the unloader into a vessel.
- A foldable leg which makes it easy to store and insert the unloader into a vessel.
- A counterweight for balancing the unloader when the foldable leg is moved into its folded position.
- A balance beam for balancing the unloader during operation and when the foldable leg is in the folded position.
- A pivot joint for attaching a conveyor to the unloader that allows three axis movement.
- A rack and pinion mechanism for rotating the unloader with respect to the conveyor.
- A positive discharge wheel that also allows the unloader to have a more compact shape.
- A movable power line connection that allows for rotation of the unloader with respect to the conveyor without entanglement or pinching of the power lines.
- A tubular frame with a vertical divider plate for compactness and simplicity of design.
- A set of curved guide plates for preventing the chain from being damaged when the foldable leg is folding and unfolding.
- An adjustable chain for providing larger allowable line loads.
- A spring hinged chain with a master link.
- An arrangement of buckets mounted to the side of the chain for assisting in tracking the chain as it travels around its wheels.

Readers will find further objects and advantages of the invention from a consideration of the ensuing description and the accompanying drawings.

DRAWING FIGURES

Figure 1:
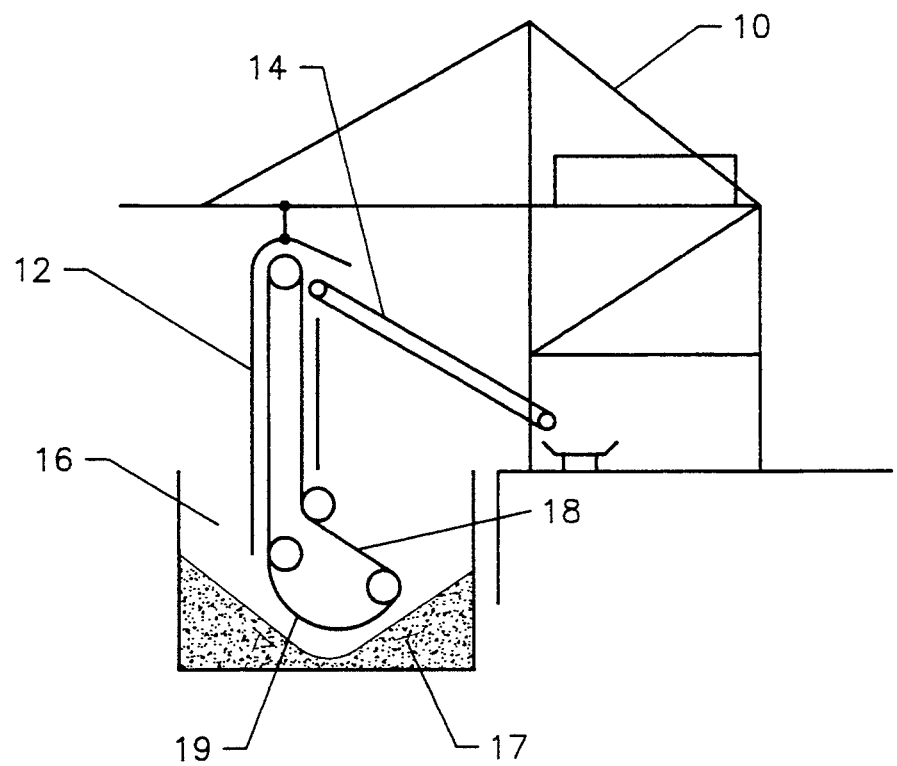
FIG. 1 shows a schematic drawing of a continuous bulk unloader/reclaimer utilized to unload cargo from the hold of a ship.

DRAWING REFERENCE NUMERALS 1 secondary loop
10 support structure
12 bucket conveyor frame
14 discharge conveyor
15 upper wheel
16 vessel's hold
17 cargo
18 bucket conveyor chain
19 primary loop of bucket conveyor—used for reclaiming
20 exit wheel
21 guide wheel
22 gather wheel
23 bucket
24 outer link
25 axis of outer link
26 pin
28 tube
30 inner link
31 axis of inner link
32 elastomer bushing
33 motor
34 rim
35 axle
36 elastomer tire
37 additional wheel
40 boom
42 boom pin
44 boom actuator
46 boom deflector
48 frame deflector
49 folding leg
50 folding leg pin
52 folding leg actuator
53 upper leg
54 curved bucket guide plates
56 counterweight
57 counterweight boom
58 counterweight pin
60 counterweight actuator
61 hydraulic power unit
62 balance beam
63 balance beam trolley rollers
64 balance beam trolley
65 balance beam trolley pin
66 balance beam actuator
67 vertical pin
68 Z axis
69 vertical pin's head
71 universal joint
72 X axis
73 yoke
74 Y axis
75 twistlock
76 bull gear segment
78 bull gear pin
80 pinion gear
82 bull gear actuator
84 power chord
86 curved track
88 carriage
89 carriage rollers
90 inner tube
92 left side of master link
94 right side of master link
96 master link bolts
98 tube
99 vertical plate
100 upward moving buckets
102 downward moving buckets

DESCRIPTION OF THE INVENTION

FIG. 1 shows a continuous unloader according to the preferred embodiment of the invention. The continuous unloader comprises a support structure 10 which supports a bucket conveyor 12. The bucket conveyor 12 is lowered into a vessel's hold 16 where it reclaims, elevates, and transfers the cargo 17 to a discharge conveyor 14 which removes the cargo 17 from the unloader for storage, etc.

Figure 2:
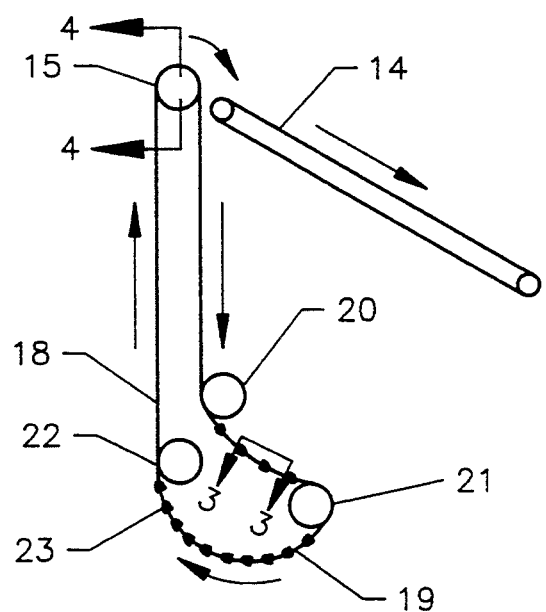
FIG. 2 shows a schematic view of the bucket chain portion of the unloader adjacent to the cargo.

FIG. 2 shows a schematic detail of the bucket conveyor 12. The exit wheel 20 directs the bucket conveyor chain 18 outward to bucket guide wheel 21. Bucket guide wheel 21 directs the chain downward into a primary loop 19 which is used to fill the buckets 23 by dragging them through the cargo 17. After traveling through this loop 19 the bucket conveyor chain 18 is gathered by gather wheel 22 and directed to an upper wheel 15. The cargo is then discharged onto the discharge conveyor 14. The upper wheel 15 directs the chain 18 downward to the exit wheel 20 completing one complete circuit. The chain's 18 flight from exit wheel 20 to guide wheel 21 also sags downward to form a secondary loop 1. This loop is kept small by the weight of the primary loop 19 or by providing a means for driving wheel 21 which would cause it to function as a tensioning wheel.

Figure 6:
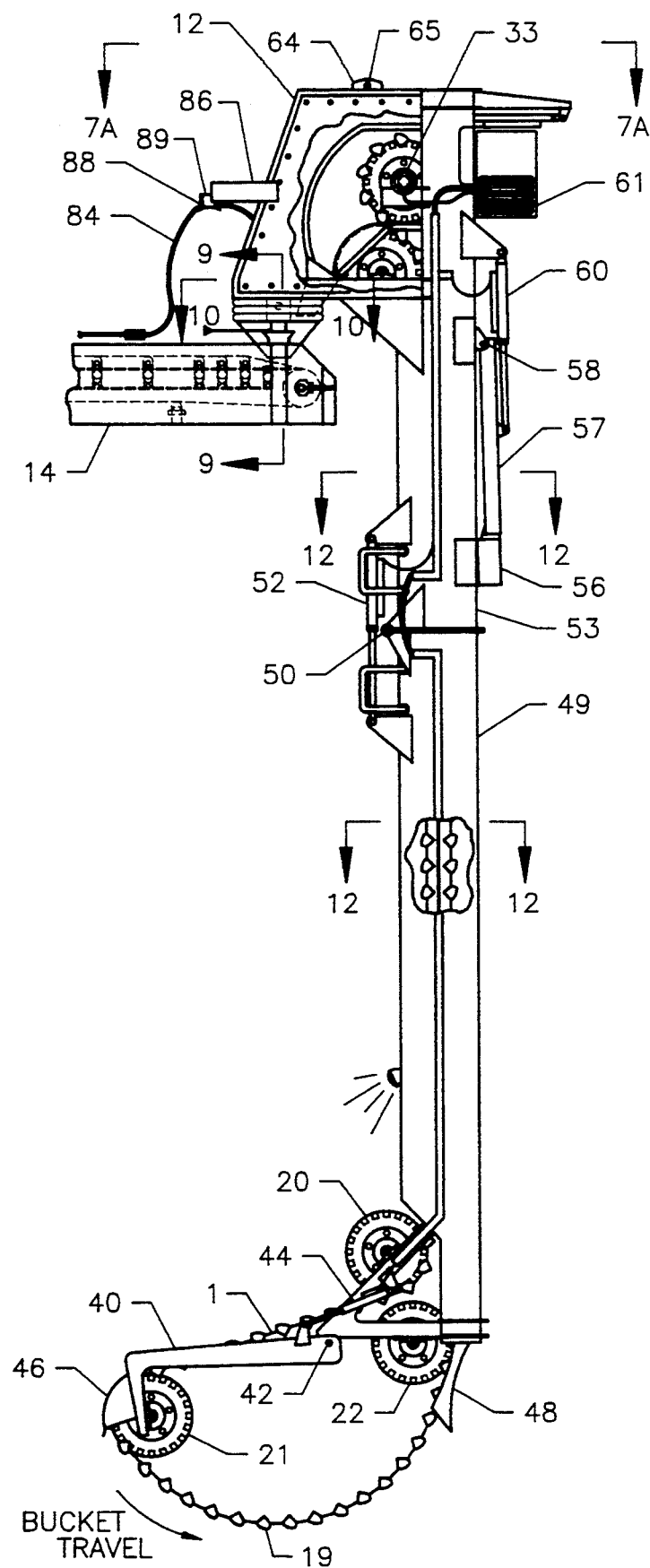
FIG. 6 shows a detailed view of the digging chain of the improved unloader.

Referring to FIG. 6, the improved unloader is comprised of the structure 12 which has an upper leg 53 attached to it and a lower leg 49. Wheel 21 is supported by a boom 40 which pivots about boom pin 42 and is held in place and moved up and down by the boom actuator 44. A boom deflector 46 and a frame deflector 48 prevent the dismounting both upwardly and laterally of the conveyor bucket chain 18 from wheels 21 and 22.

Referring to FIG. 6, the folding leg 49 is connected to the bucket conveyor frame by the folding leg pin 50. The folding leg 49 pivots about the folding leg pin 50 and is moved up and down by the folding leg actuator 52. Folding the folding leg 49 allows for clearance when moving over a vessel prior to or after unloading that vessel.

Figure 7:
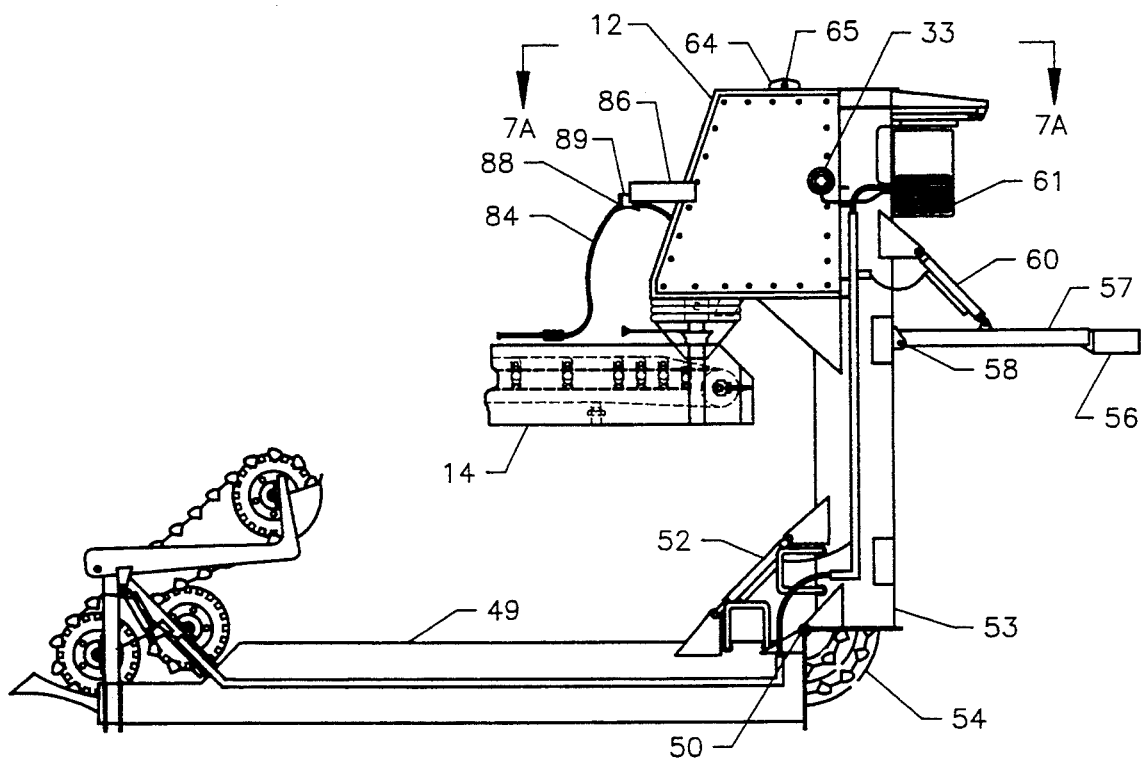
FIG. 7 shows the digging chain portion of FIG. 6 with the folding leg in the folded position.

Referring to FIGS. 6 and 7, a counterweight 56 is connected to or part of the counterweight boom 57 which is pinned by the counterweight pin 58 to the structure 12. Counterweight actuator 60 moves the counterweight up and down as required. The counterweight mechanism described functions to balance the bucket conveyor frame 12 when the folding leg 49 is being folded or is folded.

Referring to FIG. 7, a set of curved bucket guide plates 54 are attached to the conveyor structure 12 and the folding leg 49 adjacent to the bucket chain 18. These prevent kinking or pinching of the bucket conveyor chain 18 when the folding leg 49 is being folded and unfolded.

Figure 7A:
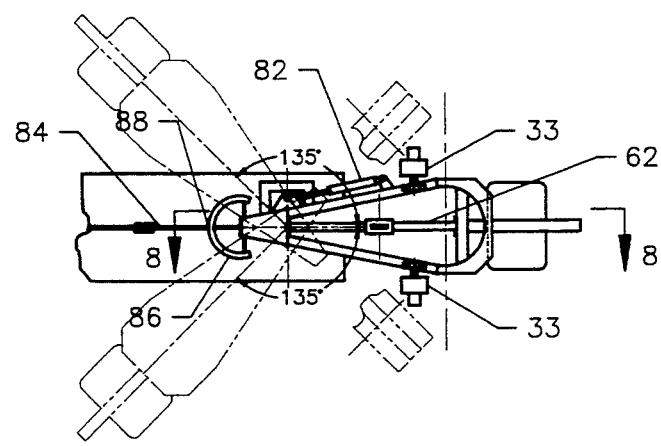
FIG. 7a is a view along lines 7a—7a of FIGS. 6 and 7.
Figure 8:
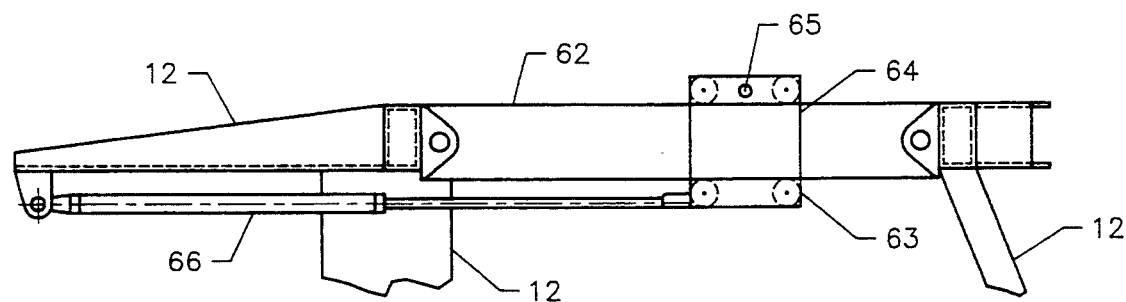
FIG. 8 is a view along line 8—8 of FIG. 7a. It shows the detail for the balance beam.

Referring to FIGS. 7a and 8, a balance beam 62 is connected at both ends to the upper part of the conveyor structure 12. A balance beam trolley 64 is attached to the balance beam by trolley rollers 63. The balance beam actuator moves the balance beam trolley 64 along the balance beam 62. The balance beam trolley pin 65 connects the balance beam trolley beam 64 to the structure 10. The balance beam trolley is moved along the balance beam 62 to keep the center of gravity of the bucket conveyor frame 12 and its attachments in line with the balance pin trolley pin 65 during operation as load on the bucket line 12 changes in direction and magnitude. It also assist the counterweight 56 in balancing the conveyor frame 12 when the folding leg 49 is being or is folded.

Figure 9:
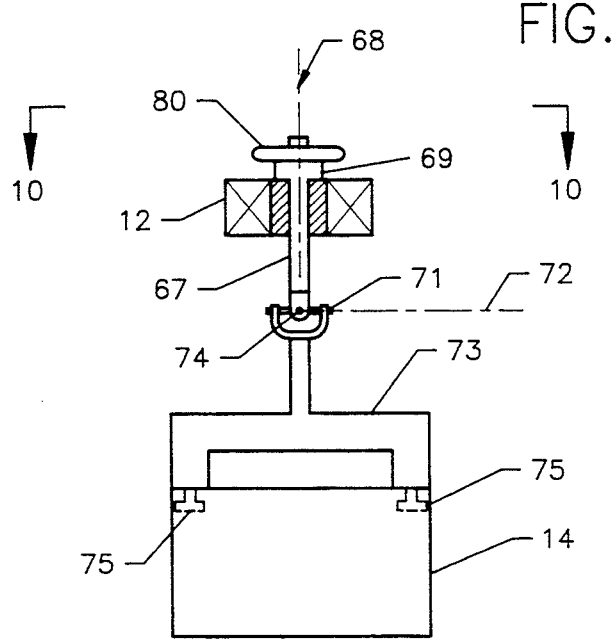
FIG. 9 is a view along line 9—9 of FIG. 6. It shows the three axis conveyor connection.

Referring to FIG. 9, at the bucket conveyor structure 12 adjacent to the discharge conveyor 14 a vertical pin 67 is attached to the conveyor structure 12. It is prevented from moving in the vertical direction by its head 69 which is supported by the bucket conveyor structure 12. Vertical pin 67 allows rotation of the bucket conveyor structure 12 with respect to the discharge conveyor 14 about the Z axis 68. At the lower end of the vertical pin 67 is attached a universal joint 71 which allows relative motion of the bucket conveyor structure 12 and the discharge conveyor 14 with respect to each other about the X axis 72 and the Y axis 74. The end of the universal joint opposite of the vertical pin 67 is attached to a yoke 73. The yoke 73 is attached to the discharge conveyor 14 via twistlocks 75 for easy removal of the discharge conveyor 14 from the bucket conveyor structure 12.

Figure 10:
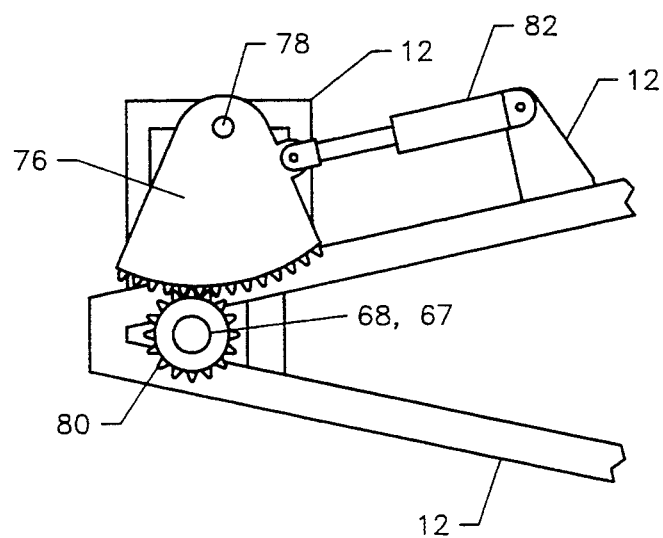
FIG. 10 is a view along line 10—10 of FIG. 9. It shows the rack and pinion rotation mechanism.
Figure 11:
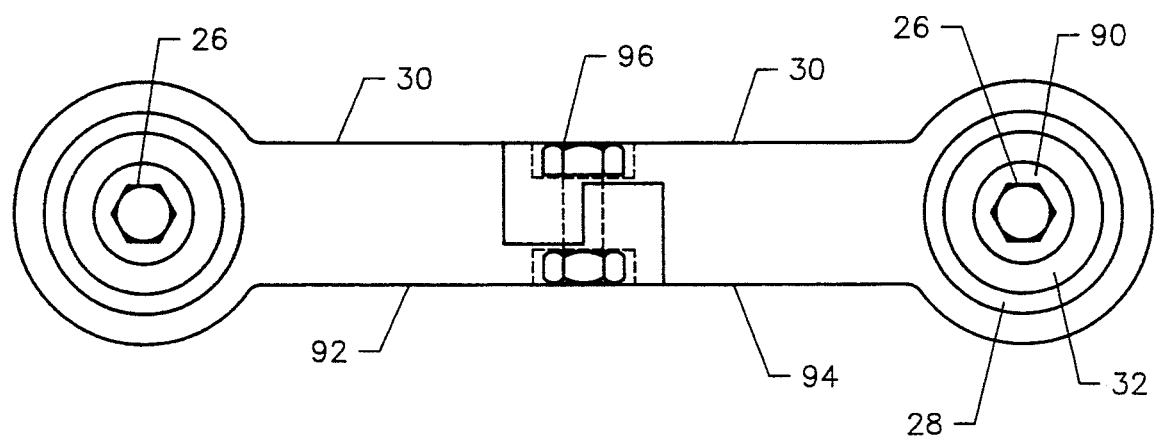
FIG. 11 shows a master link connection for the chain.

Referring to FIG. 10, a pinion gear 80 is attached to vertical pin 67. A bull gear segment 76 engages pinion gear 80. The bull gear segment is pinned to the bucket conveyor support structure via the bull gear pin 78. The bull gear actuator 82 is pinned at one end to the bull gear 76 and at its other end to the bucket conveyor support structure 12. When the actuator 82 strokes it causes relative motion to occur between the bucket conveyor support structure 12 and the discharge conveyor 14 about the Z axis 68.

Referring to FIGS. 6 and 7a, the power chord 84 which supplies electric or hydraulic power to the various components attached to the bucket conveyor frame 12 is supported at one end by the discharge conveyor 14. The power chord 84 is supported at the other end by the bucket conveyor structure 12. In its middle the power chord 84 is attached to and supported by a carriage 88. The carriage 88 has rollers 89 which roll upon a curved track section 86. The rolled beam section 86 is attached to the bucket conveyor frame 12. This arrangement prevents the power chord 84 from being broken or pinched when the bucket conveyor 12 moves relative to the discharge conveyor 14 about the Z axis 68.

Figure 3:
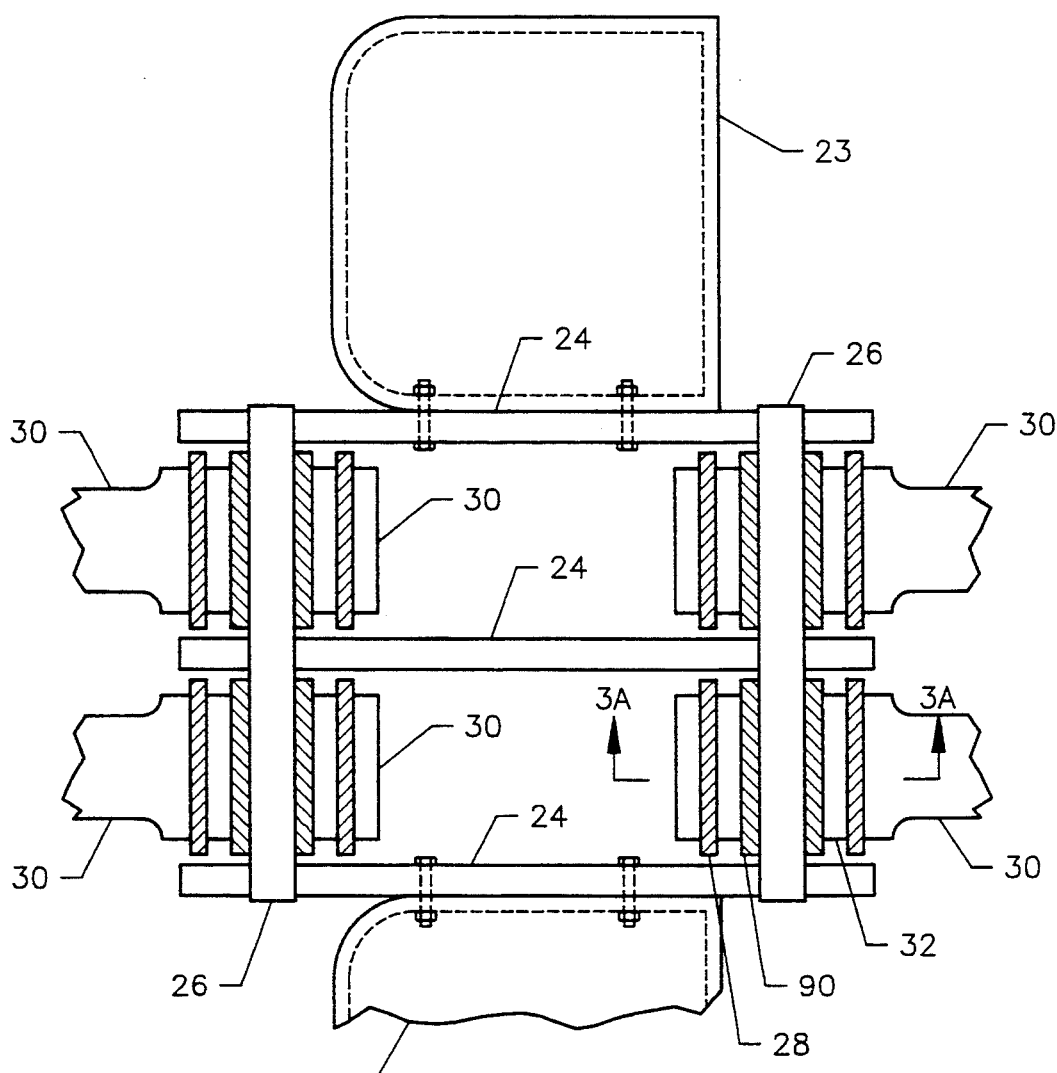
FIG. 3 shows a cross sectional view through the claim along line 3—3 of FIG. 2.

Referring to FIG. 3, the bucket conveyor chain 18 is comprised of a plurality of outer links 24 which are rigidly connected to a pin 26 at each end. Pin 26 passes through a plurality of tubes 28 positioned laterally to each other. Separating each of the tubes 28 laterally is an outer link plate 24. Each of the tubes 28 are connected to inner links 30. Inside of the tubes 28 is a coaxial inner tube 90. The pins 28 also pass through the inner tubes 90. An elastomer bushing 32 is interposed between the inner tube 90 and the tube 28. The elastomer bushing 28 is an elastomer ring where the inner periphery of the ring is attached to the outer periphery of the inner tube 90 and its outer periphery is attached to the inner periphery of the tube 28. The elastomer bushing 32 is interposed between the inner tube 90 and the tube 28 in such a manner so that it is compressed radially. The said attachment of the outer periphery of the elastomer bushing 32 to the tube 28 is provided by vulcanization, bonding, or friction due to compression. The said attachment of the inner periphery of the elastomer bushing 32 to the inner tube 90 is provided by vulcanization, bonding, or friction due to compression.

Figure 3A:
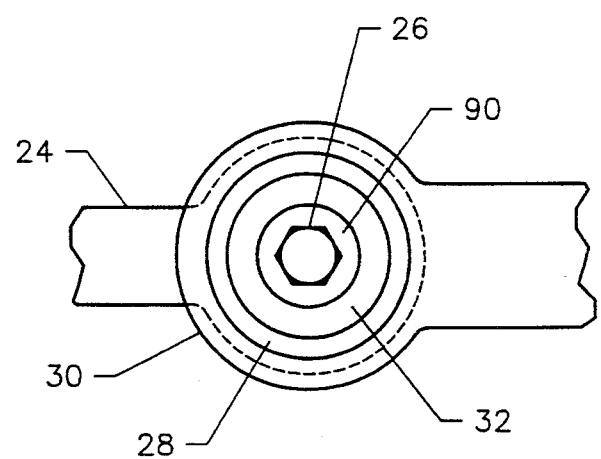
FIG. 3a is a view along line 3a—3a of FIG. 3.

Referring to FIG. 3a, the pin 26 has a hexagon shaped cross section. The inner periphery of the inner tube 90 has a female hexagon shape so that when the pin 26 slides through the inner tube 90 the hexagon shapes match up and lock together allowing torque to be transmitted from the pin 26 to the inner tube 90 when the chain's outer links 24 and inner links 30 articulate relative to one another about the axis of the pin 26. Construction of a chain with elastomer bushings 32 arranged laterally to one another allows for a building block type of chain, this eliminates the need for having a variety of chain designs. When an elastomer bushing is constructed as specified above it also functions as a torsional spring that resist hinging of adjacent links 24 and 30. Buckets 23 are attached to the bucket conveyor chain 18.

Figure 4:
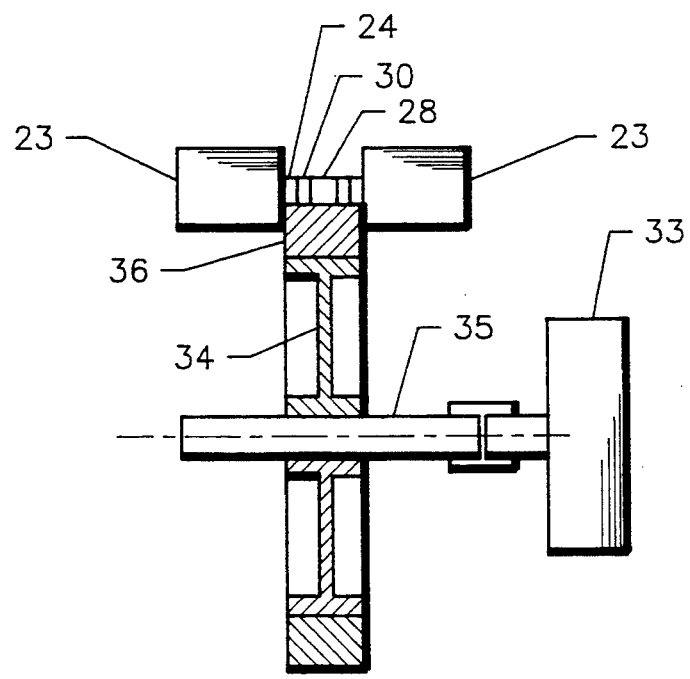
FIG. 4 shows a cross sectional view along lines 4—4 of FIG. 2. It is a cross sectional view through the chain and support wheel.

Referring to FIG. 4, the bucket conveyor chain 18 is circulated by a wheel comprised of a rim 34, an elastomer tire 36 which can be solid or pneumatic. The inner link 30 and the outer link 24 ride on the elastomer tire 36. The shell of the bucket 23 can be used with the side of the elastomer tire 36 as a guide for preventing the bucket conveyor chain from derailing from the tire 36.

Figure 12:
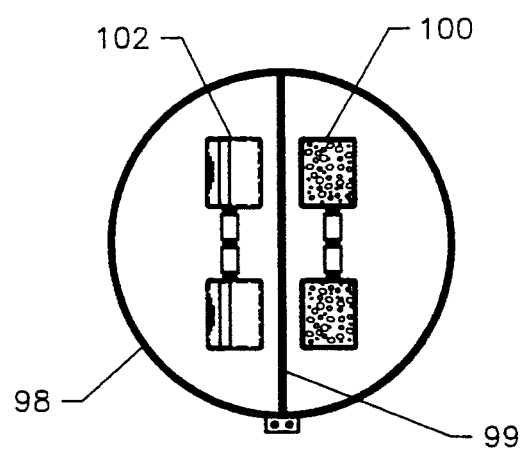
FIG. 12 is a view along line 12—12 if FIG. 6.

Referring to FIG. 12, a masterlink connection is shown. The inner link plates 30 of FIG. 3 have been cut into two parts and the ends made with interlocking sections. The left side 92 mates up to the right side 94 to form a solid shape that holds the tube 28. Bolts 96 hold the two halves together. This connection allows for the easy disassembly of the bucket conveyor chain 12 without disassembly of the pins 26 from the outer links 24 of FIG. 3.

Referring to FIG. 12, the folding leg 49, and the upper leg 53 are comprised of a leg tube 98. A vertical plate 99 runs up and down the leg tube 98 and is attached to the interior of the leg tube 98. This arrangement prevents the upward moving portion of the bucket conveyor chain 100 from colliding with the downward moving portion of the bucket conveyor chain 102. The leg tube 98 provides a compact frame and dust cover.

Referring to FIG. 6, a hydraulic power unit 61 is attached to the upper leg 53. The hydraulic power unit 61 supplies fluid power to the various actuators and wheel motors 33.

Figure 5:
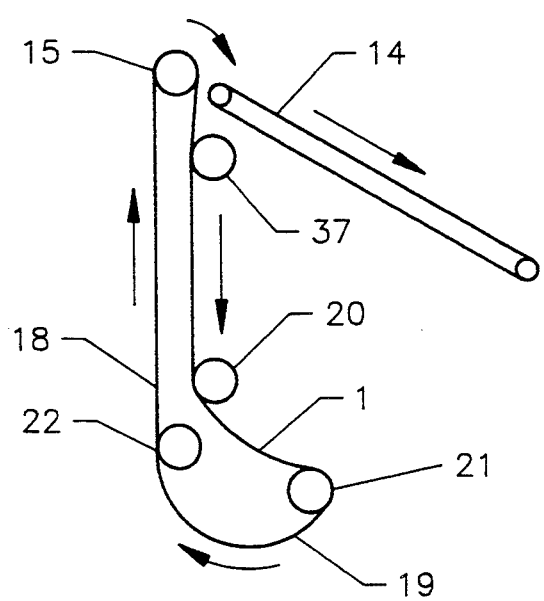
FIG. 5 shows an especially useful wheel arrangement to assist in removing the cargo from the buckets and allows for a much more compact unloader.

Referring to FIG. 5, an alternative arrangement for the circulation of the bucket conveyor chain 18 is shown. In this arrangement an additional wheel 37 has been added adjacent to and just below upper wheel 15, this wheel 37 forces the bucket conveyor chain 18 to move slightly under upper wheel 15 on its way down to exit wheel 20. This aids in discharging the buckets. It also allows for the construction of a more compact unloader because it allows for the flight of buckets going up and the flight of buckets going down to be located closer together.

OPERATION OF THE INVENTION

As shown in FIG. 1, the support structure 10 holds the bucket conveyor 12 adjacent to the cargo 17 in the vessel's hold 16. The support structure 10 can be mobile or fixed. It functions to allow the bucket conveyor to be movable inside the vessel's hold 16, and from hold to hold, and from one vessel to another. The bucket conveyor chain 18 is supported and circulated by the wheels 15, 20, 21, 22 as shown in FIG. 2 or wheels 15, 37, 20, 21, 22 as shown in FIG. 5. The said wheels can be powered or idlers as required. The buckets 23 of the bucket conveyor chain 18 drag through the cargo 17 as they traverse the loop 19. The bucket conveyor chain 18 then elevates the cargo up an over wheel 15 where a combination of gravity and centrifugal force are used to dump the cargo out of the buckets 23 onto the discharge conveyor 14 where it is removed from the unloader.

The bucket conveyor chain 18 as detailed in FIG. 3 hinges about its hinge pin 26 as it circulates about the wheels 15, 20, 21, 22 or 15, 37, 21, 22, 23. More specifically as the chain 18 approaches and enters a wheel it is forced to hinge about its hinge pin 26. Hinging causes the elastomer bushing 32 to be stressed so that it elastically deforms allowing the hinging to take place by deformation of the elastomer material.

Because hinging occurs by deformation of the elastomer material there is no sliding friction. This eliminates the need for lubrication. This also eliminates wear due to the ingress of dirt and other abrasive materials into the pins and bushings of bicycle type chains. Deformation of the elastomer during hinging makes the elastomer bushing also function as a torsional spring. The torsional spring is designed to resist hinging with enough force to prevent the chain from freely slamming onto the sprocket as it enters and seats on the sprocket. This is because the spring characteristics of the elastomer bushing acts to reduce the impact velocity of the chain's links with the wheel. Detrimental pounding can for all practical purposes be eliminated if the torsional spring force is strong enough to reduce substantially the impact velocity as described in my U.S. Pat. No. 5,127,884. It has been found that for conveyor chains which have a pitch of 3 inches or greater (pitch is the distance from one pin to an adjacent pin) and travel at speeds of 300 feet per minute or higher require a spring that exerts a torsional force greater than or equal to 10 foot pounds. Hinging occurs anytime a wheel causes the chain to bend. The reduction or elimination of pounding which is due to chordal action allows for higher operating speeds of the chain. Higher chain speeds allow for smaller chains and a practical unloader size.

Referring to FIGS. 2 and 4, the elastomer tires 36 which comprise the wheels 15, 20, 21, 22 are rugged and long lasting and together with the high speed action of the bucket conveyor chain 18 eliminate the need for metal sprockets and provide long trouble free operation. Sprockets are not required because with the higher conveyor chain speeds 18 the same amount of work can be done with lower line loads. This allows for the friction between the tire 36 and chain 18 to be of adequate magnitude to provide traction for propelling the chain when a motor 33 is attached to the tire 36 via the axle 35 and rim 34. The elastomer tire 36 also serves as a clutch mechanism that prevents excessive line loads should the bucket conveyor chain 18 snag.

The various methods of operation of the various components of the unloader have been described for clarity in the above section title Description of the Invention.

While the above description contains many specifications, the reader should not construe these as limitations on the scope of the invention, but merely as exemplifications of preferred embodiments thereof. Those artisans skilled in the art will envision many other possible variations that are within its scope. For example skilled artisans will readily be able to change the dimensions and shapes of the various embodiments. The elastomer bushing can be made of different flexible materials. The buckets can be of many different shapes and attached anywhere to the chain. Wheels can be arranged in a variety of ways. Alternate means can be used to reclaim and feed cargo to the bucket conveyor. The elastomer bushing can be comprised of a plurality of axially spaced elastomer donuts as is described in prior art relating to tracked vehicles. The tube 28 can be substituted by boring a hole in a link for inserting the elastomer bushing directly into the link, artisans will be able to envision combining the elastomer bushing with metal bearings to increase the load carrying capacity of the chain. The elastomer bushing can also be used as a seal to protect metal bushings from contaminants and to hold lubricants. The shape of links can also be varied. Also, the support structure can be of any type or variety suitable for holding and placing the bucket conveyor in the material to be handled. The discharge conveyor can be of any type required to remove the cargo from the bucket conveyor. The improvements herein can also be used for the tracks of tracked vehicles. Also, the means and techniques described for increasing chain performance for a chain entering a wheel can also be used to increase chain performance as it exits a wheel.

Accordingly the reader is requested to determine the scope of the invention by the appended claims and their legal equivalents, and not by the examples which have been given.

I claim:

1. In an improved continuous bulk unloader/reclaimer comprising
   a frame,
   an endless bucket chain comprising a plurality of adjoining links,
   wherein said adjoining links are connected together to form a hinge,
   a discharge conveyor,
   a plurality of wheels mounted to said frame,
   wherein said plurality of wheels supports and circulates said endless bucket chain about said plurality of wheels,
   means connected to said frame near the lower end of said frame for deflecting said bucket chain outward and down to form a loop,
   said discharge conveyor being connected to said frame, and
   wherein said bucket chain contacts the material to be reclaimed while traversing said loop,
   the improvement comprising:
   a means for resisting hinging between said adjoining links, the means for resisting comprising:
   a pair of elements concentric about an axis, one of said concentric elements being a part of a first of said links and the other of said concentric elements being a part of a second of said links, and
   a means for transmitting a restoring torque between said elements located between said elements, the restoring torque exerting a force toward a neutral position of said elements as said elements pivot relative to each other about said axis.

2. In an improved continuous bulk unloader/reclaimer comprising
   a frame,
   an endless bucket chain comprising a plurality of adjoining links,
   wherein said adjoining links are connected together to form a hinge, a discharge conveyor, a plurality of wheels mounted to said frame, wherein said plurality of wheels supports and circulates said endless bucket chain about said plurality of wheels, means connected to said frame near the lower end of said frame for deflecting said bucket chain outward and down to form a loop, said discharge conveyor being connected to said frame, and wherein said bucket chain contacts the material to be reclaimed while traversing said loop, a pivotal boom, an actuator, providing a means for attaching said pivotal boom to the said frame and, wherein a means is provided for connecting said actuator at one end to said frame and at its other end to said pivotal boom, wherein a means is provided for mounting one of said wheels to the said pivotal boom, the improvement comprising:

a means for resisting hinging between said adjoining links, the means for resisting comprising:

a pair of elements concentric about an axis, one of said concentric elements being a part of a first of said links and the other of said concentric elements being a part of a second of said links, and a means for transmitting a restoring torque between said elements located between said elements, the restoring torque exerting a force toward a neutral position of said elements as said elements pivot relative to each other about said axis.

3. In an improved continuous bulk unloader/reclaimer comprising a frame, an endless bucket chain comprising a plurality of adjoining links, wherein said adjoining links are connected together to form a hinge, a discharge conveyor, a plurality of wheels mounted to said frame, wherein said plurality of wheels supports and circulates said endless bucket chain about said plurality of wheels, means connected to said frame near the lower end of said frame for deflecting said bucket chain outward and down to form a loop, said discharge conveyor being connected to said frame, and wherein said bucket chain contacts the material to be reclaimed while traversing said loop, said frame being comprised in part by a vertical hollow member wherein said bucket chain travels, said vertical hollow member being divided into an upper and lower section somewhere between its ends, a pivot, providing a means for connecting said pivot to the said upper and lower section together to form a hinge, an actuator, providing a means for connecting said actuator at one end to said upper section and its other end to said lower section, the improvement comprising:

a means for resisting hinging between said adjoining links, the means for resisting comprising:

a pair of elements concentric about an axis, one of said concentric elements being a part of a first of said links and the other of said concentric elements being a part of a second of said links, and a means for transmitting a restoring torque between said elements located between said elements, the restoring torque exerting a force toward a neutral position of said elements as said elements pivot relative to each other about said axis.

4. The apparatus of claim 3, further comprising, a counterweight, an arm, an actuator, providing a means for pinning said arm to said frame, providing a means for attaching said counterweight to said arm, providing a means for connecting said actuator at one end to said frame and at its other end to said arm.

5. The apparatus of claim 3, further comprising, a deflector plate, providing a means for mounting said deflector plate to said frame near said pivot to prevent pinching of said bucket chain as said upper and lower sections of said frame hinge relative to each other about said pivot.

6. In an improved continuous bulk unloader/reclaimer comprising a frame;

an endless bucket chain comprising a plurality of adjoining links, wherein said adjoining links are connected together to form a hinge, a discharge conveyor, a plurality of wheels mounted to said frame, wherein said plurality of wheels supports and circulates said endless bucket chain about said plurality of wheels, means connected to said frame near the lower end of said frame for deflecting said bucket chain outward and down to form a loop, said discharge conveyor being connected to said frame, and wherein said bucket chain contacts the material to be reclaimed while traversing said loop, a beam, a trolley, an actuator, wherein a means is provided for attaching said beam to said frame, and wherein a means is provided for supporting and rolling said trolley back and forth along said beam, wherein a means is provided for attaching said actuator at one end to said beam and the other end to said trolley, wherein a means is provided for connecting said trolley to said support structure, wherein a means is provided for attaching said discharge conveyor to said support structure, wherein a means is provided for attaching said discharge conveyor to said frame, and the improvement comprising:

a means for resisting hinging between said adjoining links, the means for resisting comprising:

a pair of elements concentric about an axis, one of said concentric elements being a part of a first of said links and the other of said concentric elements being a part of a second of said links, and a means for transmitting a restoring torque between said elements located between said elements, the restoring torque exerting a force toward a neutral position of said elements as said elements pivot relative to each other about said axis.

7. In an improved continuous bulk unloader/reclaimed comprising
a frame,
an endless bucket chain comprising a plurality of adjoining links,
wherein said adjoining links are connected together to form a hinge,
a discharge conveyor,
a plurality of wheels mounted to said frame,
wherein said plurality of wheels supports and circulates said endless bucket chain about said plurality of wheels,
means connected to said frame near the lower end of said frame for deflecting said bucket chain outward and down to form a loop,
wherein said bucket chain contacts the material to be reclaimed while traversing said loop,
a universal joint,
providing a means for connecting said discharge conveyor to said universal joint,
providing a means for connecting said universal join to said frame,
the improvement comprising:
a means for resisting hinging between said adjoining links, the means for resisting comprising:
a pair of elements concentric about an axis, one of said concentric elements being a part of a first of said links and the other of said concentric elements being a part of a second of said links, and
a means for transmitting a restoring torque between said elements located between said elements, the restoring torque exerting a force toward a neutral position of said elements as said elements pivot relative to each other about said axis.

8. In an improved continuous bulk unloader/reclaimer comprising
a frame,
an endless bucket chain comprising a plurality of adjoining links,
wherein said adjoining links are connected together to form a hinge,
a discharge conveyor,
a plurality of wheels mounted to said frame,
wherein said plurality of wheels supports and circulates said endless bucket chain about said plurality of wheels,
means connected to said frame near the lower end of said frame for deflecting said bucket chain outward and down to form a loop,
wherein said bucket chain contacts the material to be reclaimed while traversing said loop,
a vertical pin,
providing a means for connecting said discharge conveyor to said vertical pin,
providing a means for connecting said vertical pin to said frame,
a first gear,
a means for connecting said first gear to said vertical pin,
a second gear,
providing a means for connecting said second gear to said frame,
a linear actuator,
wherein said first and second gears intermesh,
providing a means for attaching the ends of said linear actuator between said second gear and said frame,
the improvement comprising:
a means for resisting hinging between said adjoining links, the means for resisting comprising:
a pair of elements concentric about an axis, one of said concentric elements being a part of a first of said links and the other of said concentric elements being a part of a second of said links, and
a means for transmitting a restoring torque between said elements located between said elements, the restoring torque exerting a force toward a neutral position of said elements as said elements pivot relative to each other about said axis.

9. In an improved continuous bulk unloader/reclaimer comprising
a frame,
an endless bucket chain comprising a plurality of adjoining links,
wherein said adjoining links are connected together to form a hinge,
a discharge conveyor,
a plurality of wheels mounted to said frame,
wherein said plurality of wheels supports and circulates said endless bucket chain about said plurality of wheels,
means connected to said frame near the lower end of said frame for deflecting said bucket chain outward and down to form a loop,
said discharge conveyor being connected to said frame, and
wherein said bucket chain contacts the material to be reclaimed while traversing said loop,
a track,
a carriage,
a power line,
providing a means for mounting said track to said frame,
providing a means for supporting and rolling said carriage upon said track,
providing a means for attaching said power line to said carriage, and
providing a means for connecting said power line to said frame,
the improvement comprising:
a means for resisting hinging between said adjoining links, the means for resisting comprising:
a pair of elements concentric about an axis, one of said concentric elements being a part of a first of said links and the other of said concentric elements being a part of a second of said links, and
a means for transmitting a restoring torque between said elements located between said elements, the restoring torque exerting a force toward a neutral position of said elements as said elements pivot relative to each other about said axis.

10. In an improved continuous bulk unloader/reclaimer comprising
a frame,
an endless bucket chain comprising a plurality of adjoining links,
wherein said adjoining links are connected together to form a hinge,
a discharge conveyor,
a plurality of wheels mounted to said frame, wherein said plurality of wheels supports and circulates said endless bucket chain about said plurality of wheels, means connected to said frame near the lower end of said frame for deflecting said bucket chain outward and down to form a loop, said discharge conveyor being connected to said frame, and wherein said bucket chain contacts the material to be reclaimed while traversing said loop, wherein said frame is partly comprised of a vertical hollow cross section, a vertical plate, providing a means for attaching said vertical plate to the inside of said vertical hollow cross section in order to divide it into two sections, the improvement comprising:

a means for resisting hinging between said adjoining links, the means for resisting comprising:

a pair of elements concentric about an axis, one of said concentric elements being a part of a first of said links and the other of said concentric elements being a part of a second of said links, and a means for transmitting a restoring torque between said elements located between said elements, the restoring torque exerting a force toward a neutral position of said elements as said elements pivot relative to each other about said axis.

* * * * *